Sept. 13, 1932.  F. E. HUBLEY  1,877,509
SIGHT GAUGE
Filed Oct. 19, 1931

Inventor
F. E. Hubley
By Clarence A. O'Brien
Attorney

Patented Sept. 13, 1932

1,877,509

UNITED STATES PATENT OFFICE

FRED EDWIN HUBLEY, OF DETROIT, MICHIGAN

SIGHT GAUGE

Application filed October 19, 1931. Serial No. 569,805.

The present invention has to do with certain advantageous features and advantages embodied in an improved sight gauge used in a fluid line for indicating the flow of the fluid, and the improvement has specific reference to a gauge designed to accommodate the passage of gasoline, alcohol, and other inflammable liquids.

By way of introduction it is to be stated that the novelty is predicated particularly on the improved packing or gasket assembly embodied in the gauge and the peculiar adaptation of said packing for the gauge without requiring alterations of the parts of the gauge.

More explicitly stated, the gauge, which is of a well-known type, embodies an open-ended glass cylinder with metallic closures for the ends of the cylinder and means for securely binding or bolting the closures in place.

At the present time, and in the type of gauge illustrated in the drawing, the inner faces of the closures are grooved, and fitted in each groove is a cork packing ring and an associated litharge seal.

The foregoing seal is characterized by objections which the present invention is designed to overcome, for instead of using the cork packing ring and an adhesive seal, I substitute novel fiber composition gasket rings interposed between the ends of the glass cylinder and the adjacent faces of the closures in order to provide a more effective union.

The gist of the invention is, therefore, in the provision of composition fibre gaskets held in place by the conventional clamping bolts and susceptible of providing the requisite joints without the use of cement, litharge and glycerine or any other viscous substance.

The feature of the invention is in the provision of a novel joint of this type susceptible of retaining gasoline, benzol, naptha, alcohol and other penetrating acid laden liquids.

It is understood that no novelty is claimed for the specific construction of the gauge except as it is materially improved by the presence of the novel gasket contemplated to avoid leakage and to convert the otherwise objectionable gauge into one which is more satisfactory in the handling of acid liquids.

It is understood, in this connection that in handling liquids of this variety, rubber packing rings will not do, nor will the present joint embodying cork and adhesive features serve the desired result.

Figure 3:
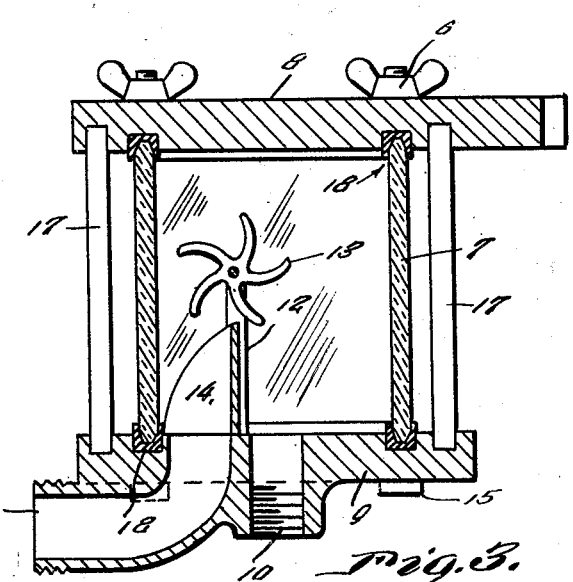
Figure 3 is a vertical section disclosing further the upper and lower gaskets in operative position.

In Figure 3, the open-ended glass cylinder is denoted by the numeral 7, the top closing plate by the numeral 8 and the base or bottom closing plate by the numeral 9. As is customary in a gauge of this type, the plate 9 is formed with a central fluid outlet nipple 10 and an intake neck 11. Then too, on the interior are supports 12 for the rotary bladed indicator 13 co-operable with an adjacent baffle 14.

The connective bolts are indicated by the numerals 15 and the wing retaining nuts by the numerals 16. The numerals 17 merely designate spacing struts to limit the bolt tightening action and to prevent breakage of the glass. Ordinarily the inner faces of these plates 8 and 9 are grooved to receive the ends of the glass cylinder and it is between these faces and ends that the adhesive and present cork packings are interposed.

In actual practice I provide grooved packing rings or gaskets each ring being designated by the numeral 18. A special fibre composition is employed in the manufacture of these rings. I do not claim invention in the particular texture of the ring itself, but in a ring whose properties provide the requisite resiliency and acid-proof and leak-proof features.

In the drawing I have shown four different species of gasket rings, each ring being substantially rectangular in cross sectional shape, and formed with a groove serving as a seat or channel for the adjacent edge of the glass cylinder. The channel in the gasket illustrated in Figure 3 is substantially semi-hexagonal in shape. Therefore, the adjacent end of the glass cylinder is of a corresponding shape to fit snugly therein.

Figure 1:
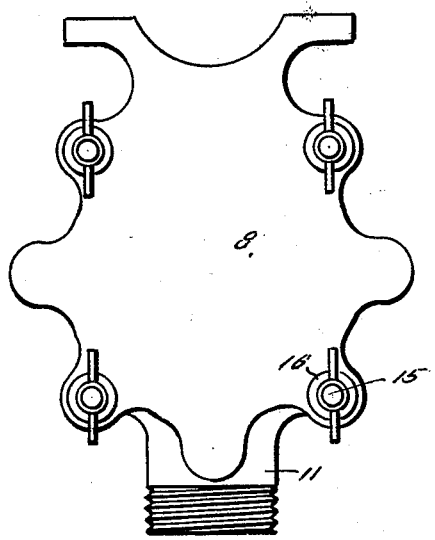
Figure 1 is a top plan view of the type of gauge under consideration.
Figure 2:
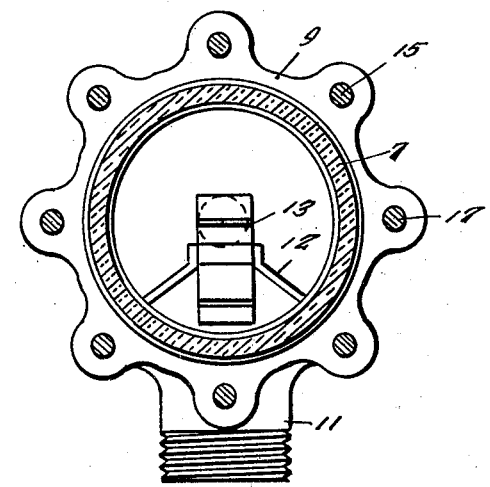
Figure 2 is a horizontal section with the improved gasket means in place.
Figure 4:
Figures 4, 5 and 6 are fragmentary sectional perspective views showing the different cross sectional configurations of the gasket.
Figure 5:
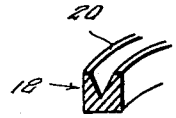
Figure 6:
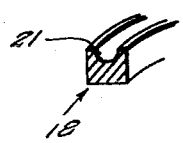

In Figure 4, the groove or channel is semi-rectangular and denoted by the numeral 19 for sake of distinction. The numeral 20 in Figure 5 represents a V-shaped groove and the numeral 21 in Figure 6 a substantially semi-circular groove. It is evident, of course, that the shape of the edge of the glass must correspond to the shape of the groove. The upper and lower gaskets in Figure 3 are seated in the grooves of the plates 8 and 9 and the bolts tightened in the usual way to provide the desired seal and leak-proof union.

Heretofore, so far as I know, gauges of this type are leaky, due to deterioration from the acid liquid or from inappropriate compositions of the materials used in constructing gaskets. Moreover, since these gauges are subject to breakage and require repair at frequent intervals, considerable time, labor and expense is attached to the reinstallation of present-day type of packing, which, as before stated, comprises a cork ring of flat cross-sectional shape, and litharge or equivalent adhesive sealing compounds.

This sealing compound in actual practice requires a minimum of four hours to set. As only one end can be litharged at one time, it necessitates a pump being shut down for approximately eight hours to allow the litharge to set and the gauge to be reinstalled. Therefore, by substituting these improved fibre packing rings, the gauge can be completely repaired and put back in place in an exceptionally short time, and inasmuch as the material is acid proof, the longevity of the union or joint is maintained indefinitely.

It is thought from the foregoing description that the advantages and novel features of the invention will be readily apparent.

It is to be understood that changes may be made in the construction and in the combination and arrangement of the several parts provided that such changes fall within the scope of the appended claims.

I claim:

1. In a structure of the class described, in combination, an open-ended visible glass cylinder, metal closing plates for the opposite ends thereof, the inner faces of said plates being grooved, clamping bolts for maintaining said plates in closing relationship, spacing struts interposed between the plates for limiting the clamping pressure of said bolts, and gaskets interposed between the plates and ends of said cylinder, said gaskets being seated in the grooves in said plates, each gasket being of general rectangular cross sectional shape and formed with a groove for reception of the adjacent end of the cylinder, each gasket being composed of acid-proof fibrous material for the purpose stated.

2. In a structure of the class described, in combination, an open-ended visible glass cylinder, metal closing plates for the opposite ends thereof, the inner faces of said plates being grooved, clamping bolts for maintaining said plates in closed relationship, spacing struts interposed between the plates for limiting the clamping action of said bolts, and gaskets interposed between the plates and ends of said cylinder, said gaskets being seated in the grooves in said plates, each gasket being of general rectangular cross sectional shape and formed with a groove for reception of the adjacent end of the cylinder, each gasket being composed of acid-proof fibrous material for the purpose stated, the groove in each gasket being substantially semi-hexagonal in shape, the adjacent end of the cylinder being of corresponding shape to fit into said groove.

3. In a structure of the class described, in combination, an open-ended visible glass cylinder, metal closing plates for the opposite ends thereof, the inner faces of said plates being grooved, clamping bolts for maintaining said plates in closing relationship, spacing struts interposed between the plates for limiting the clamping action of said bolts, and gaskets interposed between the plates and ends of said cylinder, said gaskets being seated in the grooves in said plates, each gasket being of general rectangular cross sectional shape and formed with a groove for reception of the adjacent end of the cylinder, each gasket being composed of acid-proof fibrous material for the purpose stated, the groove in said gasket being substantially V-shaped.

In testimony whereof I affix my signature.

FRED EDWIN HUBLEY.